L. H. Farnsworth,
Awl Haft.

No. 78,947.      Patented June 16, 1868.

Witnesses
Saml. N. Piper
Lauritz Möller

Luther H Farnsworth
by his attorney
R. H. Eddy

United States Patent Office.

LUTHER H. FARNSWORTH, OF HUDSON, MASSACHUSETTS.

Letters Patent No. 78,947, dated June 16, 1868.

IMPROVED AWL-HAFT.

The Schedule referred to in these Letters Patent and making part of the same.

TO ALL PERSONS TO WHOM THESE PRESENTS MAY COME:

Be it known that I, LUTHER H. FARNSWORTH, of Hudson, in the county of Middlesex, and State of Massachusetts, have invented an Improved Awl-Haft; and I do hereby declare the same to be fully described in the following specification, and represented in the accompanying drawings, of which—

Figure 1:
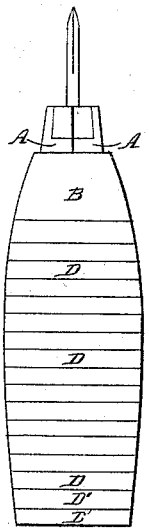
Figure 2:
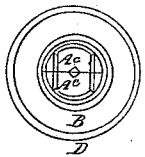

Figure 1 is a front elevation,

Figure 2 a top view, and

Figure 3:
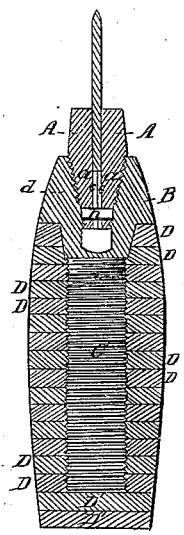

Figure 3 a longitudinal section of it.

Figure 4:

Figure 4 is a side view, and

Figure 5:

Figure 5 a top view of the hinged jaws, with their conical screw.

Figure 6:
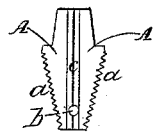

In such drawings, A A are two jaws, having their shanks made conical, and provided with a screw, cut on them, as shown at $a$ $a$. The two jaws are also to be so formed that they may be embraced or grasped by a wrench and revolved thereby. The shanks of the jaws are to be hinged together by a pin, $b$, going through both of them, near their lower ends. Each jaw, at the middle of its inner face, is to be grooved lengthwise, to receive the shank of an awl. These grooves are shown at $c$ $c$ in fig. 5, one of them also being shown at $c$ in fig. 6, which is an inner side view of one of the jaws.

The conical shanks of the jaws are to screw into a conical socket, $d$, formed in a round head, B, the socket being provided with a female screw to receive the screw of the two shanks.

A screw, C, is extended from the said socket B, in manner as represented in the drawings, and on this screw, leather disks, D D, are to be placed, and screwed until they may come close together, cement or glue being used to connect the surfaces of such disks. The end of the screw, and that of the last disk screwed thereon, are to be covered by a disk, D', connected to it, or by another set of disks, D, connected together, and cemented to such ends, the same being as represented.

On placing an awl in the grooves of the jaws, and revolving the jaws, they will screw into the socket $d$, and by it will be contracted or made to approach one another, so as to firmly grasp and hold the awl.

When the handle is formed in part as explained, of disks or sheets of leather, or its equivalent, screwed upon a screw, as set forth, it becomes very strong, and is not liable to split under the blows of a hammer while the awl is being driven into a sole.

I am aware that jaws to fit to a conical socket, and provided with long and connected shanks, and a screw and nut at the ends of the shanks, to draw the jaws into the sockets, have been applied to a handle, the whole constituting an awl-haft, in which the socket has been at one end, and the screw and nut at the other end of the haft.

I am also aware that spring-jaws, made conical, and provided with a male screw on the cone, and with a nut to screw on the said screw, have been fixed into a handle, to constitute therewith an awl-haft.

I make no claim to either of such constructions, combinations, or arrangement of parts.

I claim the jaws A A, as made with the conical and screwed shanks, and the socket-head B, as made with a conical mouth and a screw arranged therein to receive the screwed shanks of the jaws, the whole being substantially as and to operate as specified.

I also claim the combination of the screw C with the head B, and the series of disks D D', of leather or other proper material, screwed on such screw, as described.

I also claim the arrangement of the connection-rivet or pin $b$, viz, within the conical shanks, and transversely through their screw, and with respect to the jaws A A as represented.

LUTHER H. FARNSWORTH.

Witnesses:
R. H. EDDY,
F. P. HALE, Jr.